US008677445B2

(12) United States Patent
Suzuki et al.

(10) Patent No.: US 8,677,445 B2
(45) Date of Patent: *Mar. 18, 2014

(54) INFORMATION PROCESSING APPARATUS AND COMPUTER READABLE MEDIUM

(75) Inventors: Toshikatsu Suzuki, Zama (JP); Rumiko Kakehi, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 12/631,648

(22) Filed: Dec. 4, 2009

(65) Prior Publication Data

US 2010/0325690 A1 Dec. 23, 2010

(30) Foreign Application Priority Data

Jun. 22, 2009 (JP) ................................. 2009-147293

(51) Int. Cl.
*H04L 29/06* (2006.01)

(52) U.S. Cl.
USPC ................................ 726/1; 382/190; 358/443

(58) Field of Classification Search
None
See application file for complete search history.

(56) References Cited

U.S. PATENT DOCUMENTS

| | | | | |
|---|---|---|---|---|
| 5,583,941 | A * | 12/1996 | Yoshida et al. ................. | 380/51 |
| 7,827,415 | B2 * | 11/2010 | Nishiyama .................... | 713/193 |
| 2007/0174896 | A1 * | 7/2007 | Furuya et al. .................. | 726/1 |
| 2007/0208665 | A1 * | 9/2007 | Ohara ........................... | 705/51 |
| 2008/0174790 | A1 * | 7/2008 | Noguchi et al. ................ | 358/1.1 |
| 2009/0037980 | A1 | 2/2009 | Kubo | |
| 2009/0083831 | A1 * | 3/2009 | Kanai ............................. | 726/1 |
| 2010/0124355 | A1 * | 5/2010 | Saito ............................ | 382/100 |

FOREIGN PATENT DOCUMENTS

| | | |
|---|---|---|
| JP | 3493522 B2 | 2/2004 |
| JP | 2007-199909 A | 8/2007 |
| JP | 2009-33228 A | 2/2009 |

OTHER PUBLICATIONS

Japanese Office Action in corresponding JP Patent Application No. 2009-147293 dated May 21, 2013.

* cited by examiner

*Primary Examiner* — Fikremariam A Yalew
(74) *Attorney, Agent, or Firm* — Sughrue Mion, PLLC

(57) ABSTRACT

An information processing apparatus, includes: a registration unit that refers to a use limit information memory which stores use limit information indicating a policy of a use limit of a document corresponding to a set of a mark image indicating that use of the document is limited and user associated information relating to a user associated to the document, extracts the mark image and person in charge information from document image information obtained by reading a paper document including the mark image and the person in charge information indicating a person in charge with respect to contents of the paper document, acquires the use limit information corresponding to a set of the extracted mark image and the user associated information corresponding to the extracted person in charge information from the use limit information memory, and registers the acquired use limit information associated with a document including the document image information in a document memory.

8 Claims, 11 Drawing Sheets

FIG.2

| POLICY ID | USE PERIOD | USE RANGE | ALLOWABLE OPERATIONS |
|---|---|---|---|
| POLICY1 | 2 YEARS | XX PROJECT | READ/EDIT |
| POLICY2 | INDEFINITE | D GROUP | READ |
| POLICY3 | 10 YEARS | D GROUP | READ/EDIT |
| POLICY4 | 3 YEARS | USER A | READ/EDIT |
| POLICY5 | 5 YEARS | PERSONNEL DEPARTMENT XXX SECTION | READ |
| POLICY6 | 3 YEARS | CUSTOMER SUPPORT CS MANAGER | READ |
| ... | ... | YY SECTION, D GROUP | READ |
| | | EMPLOYEE | READ |
| | | ... | ... |

FIG.4

| STAMP IMAGE | USER INFORMATION | POLICY ID |
|---|---|---|
| CLASSIFIED | XX PROJECT | POLICY1 |
| CLASSIFIED | D GROUP | POLICY2 |
| CLASSIFIED | YY SECTION | POLICY5 |
| PRIVATE | PERSONNEL INFORMATION ROSTER | POLICY3 |
| PRIVATE | CUSTOMER SUPPORT | POLICY4 |
| RESTRICTED TO PROJECT ONLY | XX PROJECT | POLICY1 |
| ... | ... | ... |

FIG.5

| GROUP NAME | MEMBER | USER ID |
|---|---|---|
| XX PROJECT | TARO FUJI | UID1 |
| XX PROJECT | ... | ... |
| D GROUP | JIRO FUJI | UID3 |
| D GROUP | ... | ... |
| YY SECTION | SABURO FUJI | UID4 |
| YY SECTION | ... | ... |
| PERSONNEL INFORMATION ROSTER | TARO FUJI | UID1 |
| PERSONNEL INFORMATION ROSTER | ... | ... |
| CUSTOMER SUPPORT | HANAKO FUJI | UID2 |
| CUSTOMER SUPPORT | ... | ... |
| ... | ... | ... |

FIG.6

| USER ID | STAMP IMAGE | EMPLOYEE NUMBER | AFFILIATION | NAME |
|---|---|---|---|---|
| UID1 | (stamp: XX / FUJI) | 12345 | XX PROJECT | TARO FUJI |
| UID2 | (stamp: GENERAL AFFAIRS DEPARTMENT / FUJI) | 23456 | GENERAL AFFAIRS DEPARTMENT | HANAKO FUJI |
| ⋮ | ⋮ | ⋮ | ⋮ | ⋮ |

FIG.9

| STAMP ID | STAMP IMAGE | SECURITY LEVEL |
|---|---|---|
| STAMP1 | TOP SECRET | SL1 |
| STAMP2 | CLASSIFIED | SL2 |
| STAMP3 | RESTRICTED TO SECTION ONLY | SL2 |
| STAMP4 | PRIVATE | SL3 |
| STAMP5 | RESTRICTED TO COMPANY ONLY | SL4 |
| ... | ... | ... |

FIG.10

| SECURITY LEVEL | USER INFORMATION | POLICY ID |
|---|---|---|
| SL1 | XX PROJECT | POLICY1 |
| SL2 | D GROUP | POLICY2 |
| SL2 | YY GROUP | POLICY5 |
| SL3 | PERSONNEL INFORMATION ROSTER | POLICY3 |
| SL3 | CUSTOMER SUPPORT | POLICY4 |
| SL4 | ANYONE | POLICY6 |
| ... | ... | ... |

FIG.11

| STAMP IMAGE | USER INFORMATION | POLICY ID | USE PERIOD |
|---|---|---|---|
| CLASSIFIED | XX PROJECT PLAN T | POLICY1 | — |
| | XX PROJECT | POLICY1 | 1 YEAR |
| | D GROUP | POLICY2 | 3 YEAR |
| | YY SECTION | POLICY5 | 2 YEAR |
| PRIVATE | PERSONNEL INFORMATION ROSTER | POLICY3 | — |
| | CUSTOMER SUPPORT | POLICY4 | 1 YEAR |
| ... | ... | ... | ... |

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2009-147293 filed Jun. 22, 2009.

BACKGROUND

1. Technical Field

The present invention relates to an information processing apparatus and a computer readable medium.

2. Related Art

There is a technology that limits use of documents in accordance with security policies (hereinafter also simply called "policies") indicating policies of use limits of documents to prevent the abuse of those documents. In this technology, policies are set with respect to documents that become targets of use limits, and use of each document is limited in accordance with those policies. The policies that are set with respect to the documents indicate, for example, types of operations that are allowed or prohibited with respect to each user or user group and valid periods in which use of the documents is allowed.

SUMMARY

According to an aspect of the present invention, there is provided an information processing apparatus, including: a registration unit that refers to a use limit information memory which stores use limit information indicating a policy of a use limit of a document corresponding to a set of a mark image indicating that use of the document is limited and user associated information relating to a user associated to the document, extracts the mark image and person in charge information from document image information obtained by reading a paper document including the mark image and the person in charge information indicating a person in charge with respect to contents of the paper document, acquires the use limit information corresponding to a set of the extracted mark image and the user associated information corresponding to the extracted person in charge information from the use limit information memory, and registers the acquired use limit information associated with a document including the document image information in a document memory.

BRIEF DESCRIPTION OF THE DRAWINGS

Exemplary embodiments of the present invention will be described in detail based on the following figures, wherein:

FIG. 2 is a diagram showing an example of contents of a policy table;

FIG. 4 is a diagram showing an example of contents of a stamp-associated information table;

FIG. 5 is a diagram showing an example of contents of a group information table;

FIG. 6 is a diagram showing an example of contents of a user stamp table;

FIG. 9 is a diagram showing another example of contents of the stamp-associated information table;

FIG. 10 is a diagram showing an example of contents of a security level table;

FIG. 11 is a diagram showing yet another example of contents of the stamp-associated information table;

DETAILED DESCRIPTION

Figure 1:
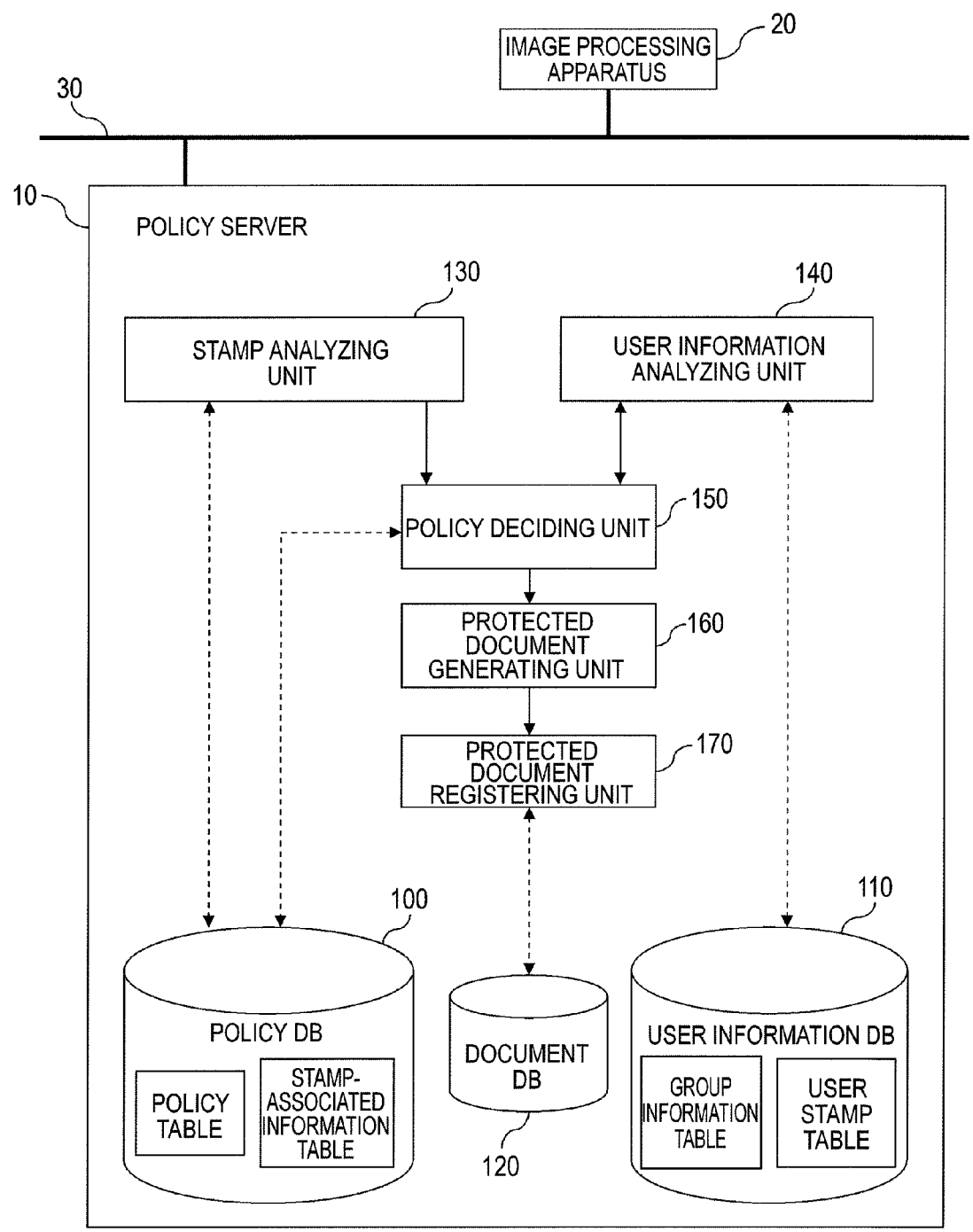
FIG. 1 is a diagram showing an example of a configuration of a system that applies policies with respect to documents.

FIG. 1 shows an example of a configuration of a system that applies policies with respect to documents. The system of the example of FIG. 1 has a configuration where a policy server 10 and an image processing apparatus 20 are interconnected via a network 30.

The image processing apparatus 20 is equipped with a scanner function that scans and reads a paper document to generate document image data. The image processing apparatus 20 transmits the generated document image data to the policy server 10. The image processing apparatus may also, in addition to a scanner function, be equipped with one or more of a printing function that prints an electronic document on a recording medium such as paper, a copy function that copies a paper document, and a fax function that transmits and receives faxes. It will be noted that FIG. 1 shows just one image processing apparatus 20, but the system of the present example may also include a plurality of the image processing apparatuses 20.

The policy server 10 manages policies that are applied with respect to documents. The policy server 10 is equipped with a policy database (DB) 100, a user information database (DB) 110, a document database (DB) 120, a stamp analyzing unit 130, a user information analyzing unit 140, a policy deciding unit 150, a protected document generating unit 160 and a protected document registering unit 170.

The policy database 100 is a database that stores information relating to policies. The policy database 100 stores a policy table and a stamp-associated information table.

FIG. 2 shows an example of contents of the policy table. In the policy table of the example of FIG. 2, a policy ID, a use period, a use range and allowable operations are associated and registered in regard to each policy. The use period indicates a period in which a user or group indicated in the corresponding use range can use a document. The use range indicates a subject who executes an operation with respect to a document and is indicated by identification information of a user or group (a user ID, an affiliate organization name, etc.) or the role of a user with respect to a document (e.g., the "creator" of a document, etc.). The allowable operations indicate types of operations that are allowed with respect to a user or group indicated in the corresponding use range. Contents of the policies are defined by the values of the use periods, the use ranges and the allowable operations.

Figure 3:
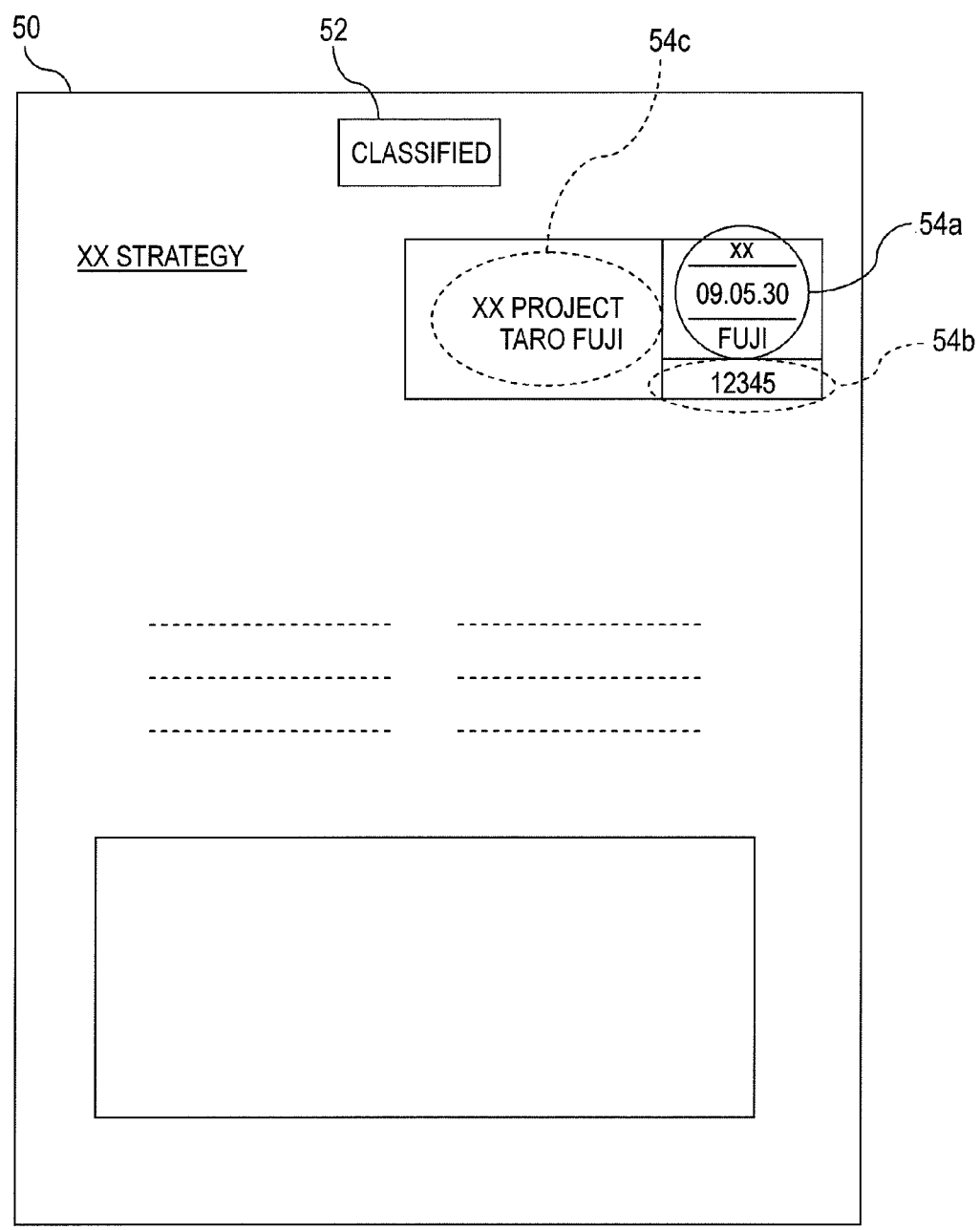
FIG. 3 is a diagram schematically showing a paper document as an object for processing in the system of the present example.

FIG. 3 is a diagram schematically showing an example of a paper document as an object for processing in the system of the present example. The paper document of the example of FIG. 3 is one example of a document that is created in the affairs of a company. In the example of the present system, a mark 52 indicating that a policy is to be applied with respect to an electronic document corresponding to a paper document 50 is applied with respect to that paper document 50 by, for example, pressing a stamp (a seal). Moreover, the paper document 50 includes person in charge information 54*a*, 54*b* and 54*c* indicating information in regard to a person in charge with respect to contents of the paper document 50. The person in charge with respect to the contents of the paper document is, for example, the creator of that paper document. Further, for example, the person in charge with respect to the contents of the paper document may also be the discloser or publisher of that paper document. In the example of FIG. 3, the person in charge information 54*a*, 54*b*, and 54*c* indicates information in regard to the creator of the paper document 50. A date mark 54*a* is applied by impressing a stamp of a date mark of the creator of the paper document 50. The date mark 54*a* indicates the affiliation of the creator ("XX"), the date when the stamp was impressed ("May 30, 2009") and the name of the creator ("Fuji"). Inside a dashed line 54*b*, there is shown the employee number of the creator ("12345"). Here, the employee number is an identification number that is assigned to each employee in the company. Further, inside a dashed line 54*c*, there are shown the affiliation of the creator ("XX Project") and the name of the creator ("Taro Fuji").

When the policy server 10 acquires the document image data obtained as a result of the image processing apparatus 20 reading the paper document 50 exemplified in FIG. 3, the policy corresponding to the mark 52 and the person in charge information 54 included in the document image data is set with respect to an electronic document that includes the document image data. Information relating to the mark 52 and the person in charge information 54 is registered in the stamp-associated information table in the policy database 100 of the present example.

FIG. 4 shows an example of contents of the stamp-associated information table. In the stamp-associated information table of the example of FIG. 4, there are registered the respective items of stamp image, user information and policy ID. In the column of stamp image, there are registered images of marks such as the aforementioned mark 52. As the stamp images, for example, there are used image data obtained by scanning and reading beforehand papers on which corresponding stamps have been impressed. In the column of user information, there is registered information indicating groups of users that use the system of the present example. In the example of FIG. 4, only groups of users are registered as the user information, but identification information of single users may also be registered as the user information. In the column of policy ID, there are registered policy IDs of policies corresponding to sets of the stamp image and the user information. It will be noted that, in the description below, the policy IDs exemplified in FIG. 4 will indicate the policy IDs registered in the policy table of the example of FIG. 2.

Although it will be described in detail later, the policy server 10 of the present example acquires, from stamp-associated information, the policy ID for which has been established a correspondence with a set of a stamp image extracted from document image data obtained as a result of the image processing apparatus 20 reading a paper document and user information corresponding to person in charge information extracted from the document image data and applies the policy of the policy ID acquired with respect to an electronic document including the document image data.

Referring again to FIG. 1, the user information database 110 is a database that stores information relating to users of the system of the present example. The user information database 110 stores a group information table and a user stamp table.

The group information table holds information of affiliate groups (affiliate organizations) of users. FIG. 5 shows an example of contents of the group information table. In the table of the example of FIG. 5, there are registered the respective items of group name, member and user ID. In the column of group name, there are registered names of groups of users. In the column of member, there are registered names of users belonging to the corresponding groups. The user IDs are identification information that the system of the present example uniquely applies to each user, and in the column of user ID in the table of the example of FIG. 5, there are registered values of user IDs of the corresponding member users.

The user stamp table is a table that holds information that is used to analyze the date mark 54*a* applied to the paper document 50 of the example of FIG. 3. FIG. 6 shows an example of contents of the user stamp table. In the table of the example of FIG. 6, values of the respective items of stamp image, employee number, affiliation and name are registered in association with the user IDs of each user. In the column of stamp image, there are registered images of date marks that include the affiliations and the names of the corresponding users. The portions of the date marks that indicate the date are excluded from the images registered in the stamp images. In the example of FIG. 6, the date portions are shown as blank spaces. In the respective columns of employee number, affiliation and name, there are registered the employee numbers of the corresponding users, the groups to which the corresponding users belong and the names of the corresponding users.

Returning to the description of FIG. 1, the document database 120 is a database that stores protected documents that are documents to which policies have been applied. The protected documents include document identification information, policy IDs of applied policies and contents data of those documents. The contents data may be encrypted. The document database 120 may also store a table that holds the policy IDs and protected document attribute information (creator, date and time of creation, stored position of protected document in the document database 120, etc.) in association with the protected document identification information.

The stamp analyzing unit 130 analyzes the document image data received from the image processing apparatus 20 and extracts, from the document image data, the stamp image registered in the stamp-associated information table within the policy database 100.

The user information analyzing unit 140 refers to the user information database 110, analyzes the document image data received from the image processing apparatus 20, and extracts the person in charge information included in the document image data. For example, the user information analyzing unit 140 recognizes the date mark within the document image data and checks whether or not the image of the recognized date mark corresponds to a stamp image registered in the user stamp table. If a stamp image of the corresponding date mark is registered in the user stamp table, then the user information analyzing unit 140 acquires the corresponding user ID from the user stamp table. Further, the user information analyzing unit 140 acquires, from the group information table, the group name of the group to which the user of the acquired user ID belongs.

The policy deciding unit 150 uses the stamp image that the stamp analyzing unit 130 has extracted from the document image data and the user information that has been acquired on the basis of the person in charge information that the user information analyzing unit 140 has extracted from the document image data to decide the policy to be applied with respect to a document including the document image data.

For example, the policy deciding unit 150 decides, as the policy to be applied with respect to the document, the policy of the policy ID for which has been established a correspondence with the set of the stamp image that has been extracted from the document image and the user information that has been extracted in the stamp-associated information table in the policy database 100.

The protected document generating unit 160 generates, as a protected document in which the policy that the policy deciding unit 150 has decided is set, an electronic document that includes the document image data that are the object for processing.

The protected document registering unit 170 registers, in the document database 120, the protected document that the protected document generating unit 160 has generated.

An example of the configurations of the policy server 10 and the system that includes the policy server 10 has been described above. An example of a procedure of processing that generates a protected document of document image data acquired from the image processing apparatus 20 in the policy server 10 will be described below. When the image processing apparatus 20 reads a paper document to generate document image data, the image processing apparatus 20 transmits the generated document image data to the policy server 10. When the policy server 10 receives the document image data from the image processing apparatus 20, the policy server 10 starts the processing of the procedure of the example of FIG. 7.

Figure 7:
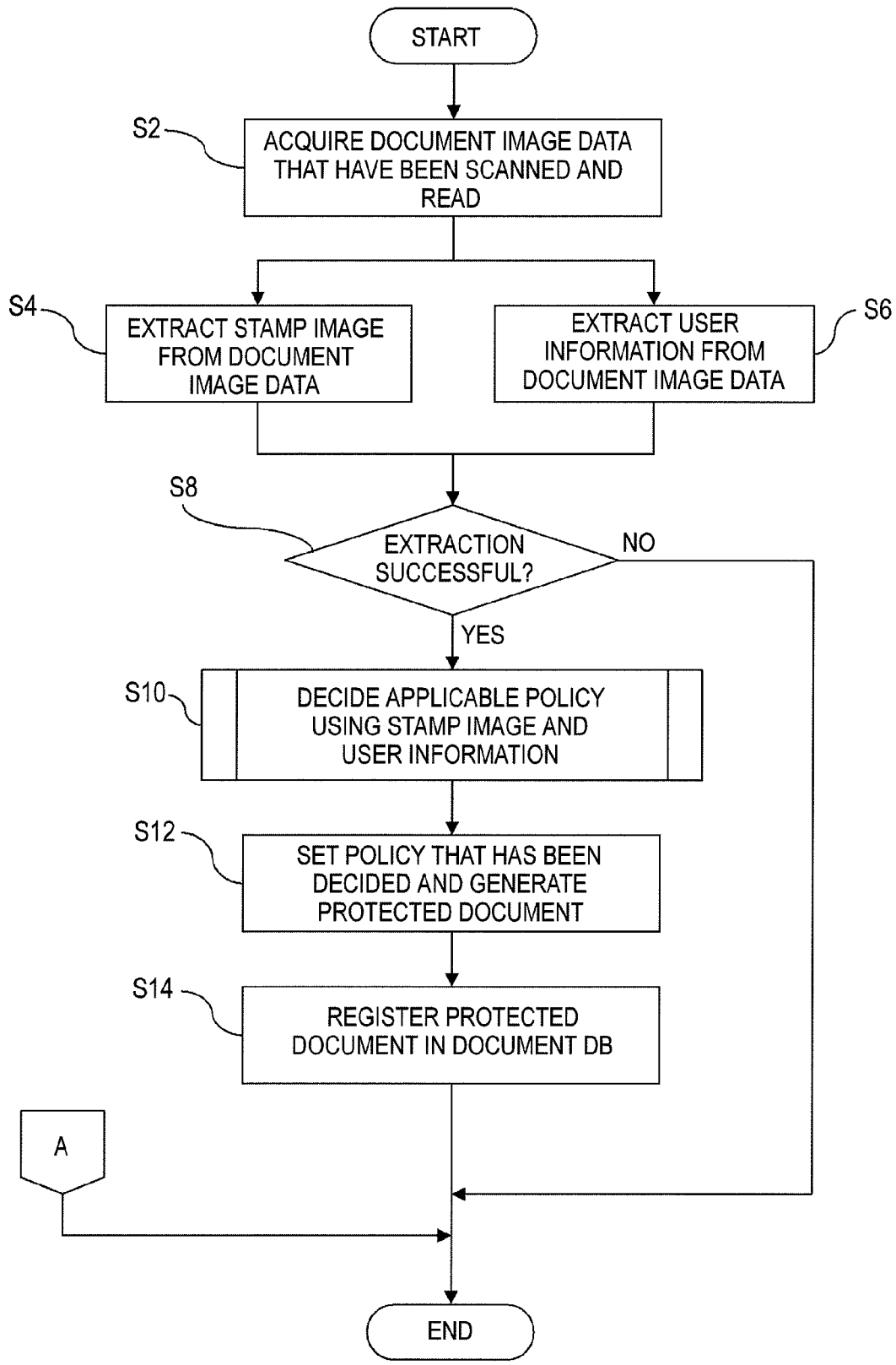
FIG. 7 is a flowchart showing an example of a procedure of processing that generates a protected document in a policy server.

Referring to FIG. 7, the policy server 10 acquires the document image data that have been transmitted from the image processing apparatus 20 (step S2). Below, document image data that have been obtained as a result of the image processing apparatus 20 reading the paper document 50 of the example of FIG. 3 will be described as a specific example.

When the policy server 10 acquires the document image data, the stamp analyzing unit 130 refers to the stamp-associated information table in the policy database 100 and extracts the stamp image of the mark 52 from the document image data (step S4). In step S4, for example, the stamp analyzing unit 130 uses conventional image processing technology for extracting a target image that has been set beforehand from image data to perform processing that extracts the stamp image as the target image from the document image data. For example, the stamp analyzing unit 130 extracts a characteristic amount of image data from a region of a size corresponding to the size of the stamp image registered in the stamp-associated information table of regions within the document image data and repeats, while shifting the position of the region within the document image data, processing that determines the degree of similarity between the extracted characteristic amount and the characteristic amount of the stamp image. Then, at the point in time when a region within the document image data whose degree of similarity is equal to or greater than a threshold value that has been set beforehand is discovered, the stamp analyzing unit 130 extracts that region as the stamp image within the document image data. Further, a region in the paper document where a stamp is impressed may also be set beforehand. As a region where a stamp is impressed, for example, the portion of the paper document where contents of the document are not printed may be set. The user impresses a stamp only in this set region when impressing a stamp on the paper document. In this case, in step S4, the stamp analyzing unit 130 checks whether or not there is a stamp image only in regard to that region that has been set beforehand. Alternatively, because it is conceivable for the user to ordinarily impress a stamp in the margin portion of the paper document where contents of the document are not printed, for example, first, the stamp analyzing unit 130 may extract, as the margin portion, a region in the document image data where there is a relatively large number of white pixels and extract, as the stamp image within the document image data, a region in this blank space portion whose degree of similarity with the characteristic amount of the stamp image within the stamp-associated information table is equal to or greater than a threshold value. In the present example whose object for processing is the document image data of the paper document 50 of FIG. 3, the stamp image ("Classified") of the mark 52 is extracted in step S4 (see FIG. 4).

The user information analyzing unit 140 refers to the user information database 110, extracts the person in charge information 54 within the document image data, and acquires the user information corresponding to the extracted person in charge information 54 (step S6). For example, the user information analyzing unit 140 uses the same image processing technology as the stamp analyzing unit 130 to extract, from the document image data, the stamp image of the date mark 54a registered in the user stamp table in the user information database 110. Then, the user information analyzing unit 140 acquires the user ID registered in the user stamp table in correspondence with the stamp image of the date mark that has been extracted. Alternatively, the user information analyzing unit 140 may use optical character recognition (OCR) processing to extract, from the document image data, the employee number (inside the dashed line 54b of FIG. 3) included in the document image data and acquire, from the user stamp table, the user ID corresponding to the extracted employee number. Moreover, in another example, the user information analyzing unit 140 may use OCR processing to extract, from the document image data, the name (inside the dashed line 54c of FIG. 3) included in the document image data and acquire, from the user stamp table, the user ID corresponding to the extracted name. Further, the user information analyzing unit 140 may combine and perform the plurality of the preceding three examples of extracting the stamp image of the date mark, extracting the employee number and extracting the name. For example, the user information analyzing unit 140 may execute the processing of the preceding three examples in an order that has been set beforehand, perform subsequent processing if it fails at extraction, not perform subsequent processing if it succeeds at extraction, and use the user ID corresponding to the stamp image, the employee number or the name that has been extracted. When the user information analyzing unit 140 acquires the user ID on the basis of the person in charge information extracted from the document image data, the user information analyzing unit 140 refers to the group information table in the user information database 110 and acquires the group name of the group to which the user of that user ID belongs. Then, the user information analyzing unit 140 uses that user ID and the acquired group name as the user information of the processing result of step S6. It will be noted that, in the description below, the user information that is acquired from the user information database 110 on the basis of the person in charge information that has been extracted from the document image data will be described as "the user information that has been extracted from the document image data".

In the present example whose object for processing is the document image data of the paper document 50 of FIG. 3, in step S6, the user ID "Uid1" (see FIG. 6) corresponding to the stamp image of the date mark 54a and the groups "XX Project" and "Personnel Information Roster" (see FIG. 5) to which the user of the user ID "Uid1" belongs are extracted as the user information.

As for the processing of step S4 and step S6, the policy server 10 may execute either one first or perform both in parallel.

When the policy server 10 succeeds at both of extracting the stamp image (step S4) and extracting the user information (step S6) (YES in step S8), the policy server 10 proceeds to step S10.

When the policy server 10 fails at either one or both of extracting the stamp image (step S4) and extracting the user information (step S6) (NO in step S8), the policy server 10 ends the processing of the procedure of the example of FIG. 7 without executing processing from step S10 on. At this time, the policy server 10 may store the document image data in a storage device (not shown) that has been set beforehand as a place for storing documents to which policies are not applied or in a server that the user has designated.

Figure 8:
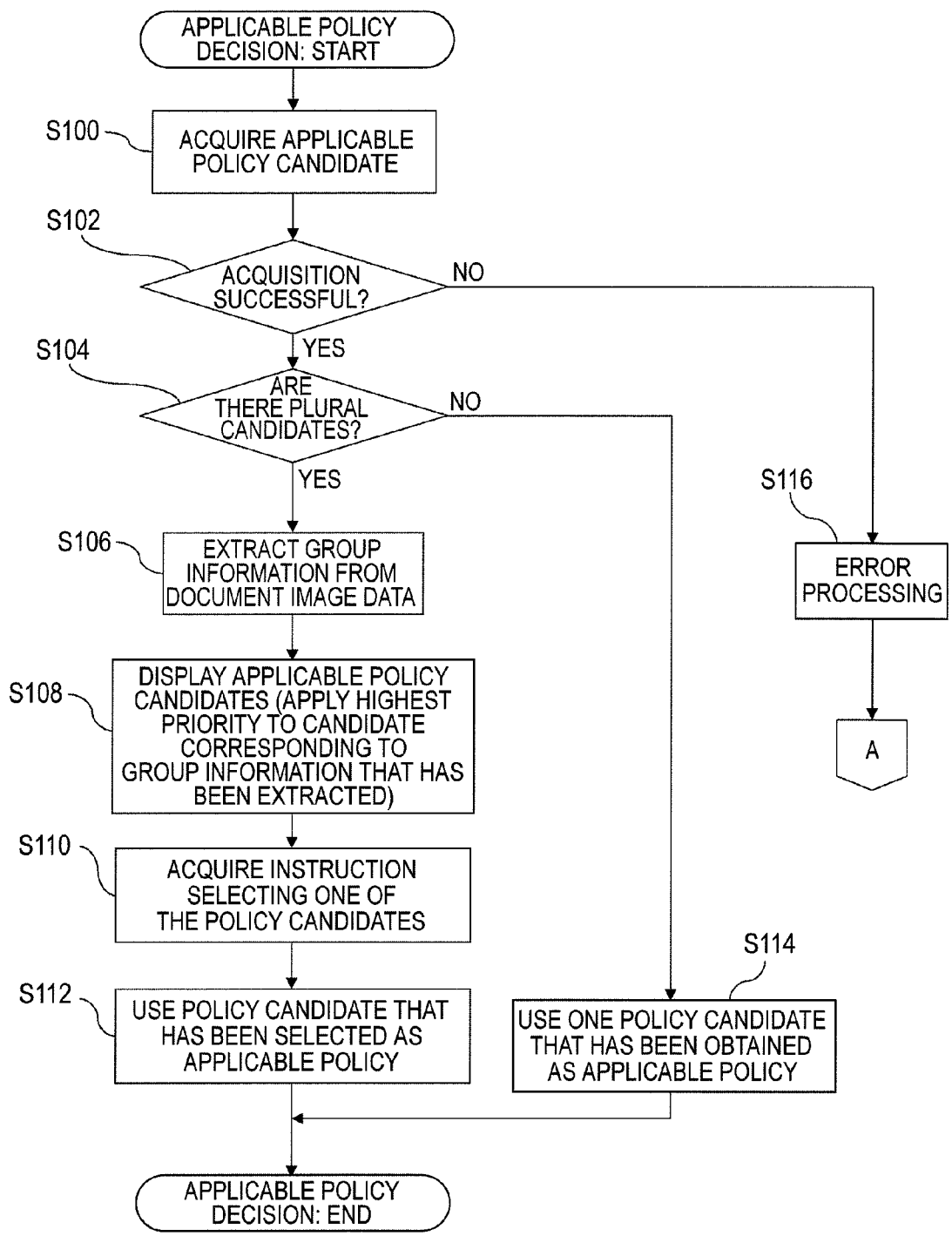
FIG. 8 is a flowchart showing an example of a procedure of applicable policy decision processing.

In step S10, the policy deciding unit 150 uses the stamp image obtained in step S4 and the user information obtained in step S6 to decide the policy to be applied with respect to a document including the document image data. FIG. 8 shows an example of the detailed procedure of step S10. The processing of the procedure of the example of FIG. 8 is started when the processing of step S10 is started.

Referring to FIG. 8, the policy deciding unit 150 refers to the stamp-associated information table in the policy database 100 and acquires, as an applicable policy candidate, the policy ID corresponding to the set of the stamp image obtained in step S4 and the user information obtained in step S6 (step S100). In the present example relating to the paper document 50 of the example of FIG. 3, as mentioned above, the stamp image "Classified" is obtained in step S4 and the user ID "Uid1" and the group names "XX Project" and "Personnel Information Roster" are obtained in step S6. Referring to the stamp-associated information table of the example of FIG. 4, of the user information ("XX Project", "D Group" and "YY Section") that becomes a set with the stamp image "Classified" obtained in step S4, what fits together with the user information obtained in step S6 is "XX Project". Consequently, in the present example, in step S100, the policy deciding unit 150 acquires, as the applicable policy candidate, the policy ID "Policy 1" corresponding to the set of the stamp image "Classified" and the user information "XX Project".

If the policy deciding unit 150 succeeds at acquiring an applicable policy candidate (YES in step S102), then whether there are plural candidates that have been acquired or just one candidate that has been acquired is checked (step S104). When there is just one candidate, as in the present example where just the one policy ID "Policy 1" is acquired as the applicable policy candidate, the policy deciding unit 150 proceeds to NO in step S104 and decides that one policy candidate as the applicable policy (step S114).

On the other hand, a plurality of applicable policy candidates may be acquired in step S100. For example, when plural group names are included in the user information obtained in step S6 and correspondences have been established between these plural group names and one stamp image in the stamp-associated information table, in step S100, a plurality of policy IDs corresponding to a set of the plural group names and the one stamp image are acquired.

When a plurality of applicable policy candidates have been acquired (YES in step S104), the policy deciding unit 150 requests the user information analyzing unit 140 to extract information relating to the affiliate groups of the person in charge from the document image data that are the object for processing. When the user information analyzing unit 140 receives this request, the user information analyzing unit 140 performs OCR processing with respect to the document image data, for example, to extract, from the document image data, the group name registered in the group information table in the user information database 110 (step S106). In the case of the document image data of the paper document 50 of the example of FIG. 3, the affiliate group of the person in charge included inside the dashed line 54c is extracted.

Then, the policy deciding unit 150 checks whether or not, of the plural group names corresponding to the policy IDs of the plural candidates, there is a group name that is the same as the group name that the user information analyzing unit 140 extracted in step S106. When there is a group name that is the same, the policy deciding unit 150 outputs, together with information specifying the policy of the policy ID corresponding to that group name, the contents of the policies of the policy IDs of the plural candidates to the image processing apparatus 20 that is the source of transmission of the document image data. In this case, for example, the policy deciding unit 150 may output information indicating that the policy of the policy ID corresponding to that group name has the highest degree of priority of the plural candidates as the policy to be applied with respect to that document. When there is not a group name that is the same, it suffices for the policy deciding unit 150 to output only the contents of the policies of the policy IDs of the plural candidates to the image processing apparatus 20. The information that the policy deciding unit 150 has outputted is displayed on a display screen (not shown) with which the image processing apparatus 20 is equipped (step S108). It will be noted that the contents of the policies of the policy IDs of the plural candidates may also be acquired from the policy table in the policy database 100.

The operator of the image processing apparatus 20 (the user who used the image processing apparatus 20 to scan and read the paper document) checks the display contents of the display screen of the image processing apparatus 20 and inputs an instruction selecting one of the plural policy candidates via an unillustrated input unit. This instruction is transmitted from the image processing apparatus 20 to the policy server 10. The policy server 10 receives this instruction from the image processing apparatus 20 (step S110).

When the policy server 10 receives the instruction selecting one of the plural policy candidates, the policy deciding unit 150 decides the policy of the policy ID selected by that instruction as the applicable policy (step S112).

When the policy deciding unit 150 decides the applicable policy in step S112 or step S114, the applicable policy decision processing of the procedure of the example of FIG. 8 ends, and the processing proceeds to step S12 of FIG. 7.

An example of a procedure of processing when the policy deciding unit 150 succeeds at acquiring an applicable policy candidate in step S100 (YES in step S102) has been described above. When the policy deciding unit 150 fails to acquire an applicable policy candidate in step S100 (NO in step S102), the policy deciding unit 150 performs error processing of contents determined beforehand (step S116). In the error processing, for example, the policy deciding unit 150 causes a display unit of the image processing apparatus 20 that is the source of transmission of the document image data to display information indicating that the policy deciding unit 150 has failed to acquire an applicable policy candidate. In addition to that display processing or instead of that display processing, the policy deciding unit 150 may also establish an association between, and register in a storage position that has been set beforehand in a storage device (not shown), the document image data that are the object for processing and information indicating that the policy deciding unit 150 has failed to acquire an applicable policy candidate in relation to the document image data. Further, for example, in the error processing, the policy deciding unit 150 may also receive setting of a policy by the operator of the image processing apparatus 20. For example, the policy server 10 causes information prompting the user to perform setting of a policy to be displayed on the display screen of the image processing apparatus 20, and the policy server 10 acquires, from the image processing apparatus 20, the contents (use period, use range and allowable operations) of the policy that the user has inputted in response to this display. Then, the policy server 10 applies a new policy ID with respect to the policy that includes the contents that the user has inputted and registers the new policy ID in the policy table. Then, the protected document generating unit 160 generates a protected document in which the policy of the new policy ID has been applied with respect to the document including the document image data that are the object for processing, and the protected document registering unit 170 registers that protected document in the document database 120. The details of the processing for generating and registering the protected document here may be the same as step S12 and step S14 (FIG. 7) described later. After the error processing, the policy deciding unit 150 ends the processing.

Returning again to FIG. 7, in step S12, a protected document to which the policy decided in step S10 has been applied is generated by the protected document generating unit 160. For example, the protected document generating unit 160 generates identification information of an electronic document including the document image data that are the object for processing and encrypts the document image data that are the object for processing. Then, the protected document generating unit 160 uses, as the protected document, an electronic document including the policy ID that the policy deciding unit 150 has decided, the identification information of the electronic document that the protected document generated unit 160 has generated and the encrypted data of the document image data that are the object for processing.

The protected document registering unit 170 registers, in the document database 120, the protected document generated in step S12 (step S14), and the processing of the procedure of the example of FIG. 7 ends.

It will be noted that, as a modification of the processing of the procedure of the example of FIG. 8, when there are a plurality of applicable policy candidates (YES in step S104), the policy server 10 may simply output an indication that there are a plurality of applicable policy candidates and end the processing without performing the processing that receives a selection and decides one applicable policy (step S106 to step S112) and without generating and registering a protected document (steps S12 and S14 of FIG. 7). The policy server 10 outputs the indication that there are a plurality of applicable policy candidates to the image processing apparatus 20, for example, and causes that indication to be displayed on the display screen of the image processing apparatus 20. In addition to or instead of output with respect to the image processing apparatus 20, the policy server 10 may also register the document image data that are the object for processing in the document database 120 (or another unillustrated storage device) in association with the policy IDs of the plural applicable policy candidates.

Use of the protected document that has been generated by the processing of the example described with reference to FIG. 7 and FIG. 8 is limited in accordance with the contents of the policy that has been applied. For example, when the user instructs execution of an operation (read, edit, print, etc.) with respect to the protected document in an unillustrated client, the client asks the policy server 10 whether or not execution of that operation is allowable. When the policy server 10 receives this inquiry, for example, the policy server 10 extracts the policy ID from the protected document, acquires the contents of the use period, use range and allowable operations for which a correspondence has been established with that policy ID, decides whether or not execution of the aforementioned operation is allowable in accordance with the acquired contents, and sends the result of the decision back to the client. The client executes the operation only when it receives information indicating that execution of the operation is allowable from the policy server 10.

In the example of the exemplary embodiment described above, a policy to be applied with respect to a document is decided using the stamp-associated information table (FIG. 4) in which correspondences between policy IDs and sets of user information and stamp images of stamps indicating that a policy is to be applied with respect to a document are directly established. An example of an exemplary embodiment where a policy is decided using a table with a different configuration from that of the stamp-associated information table of the example of FIG. 4 will be described below with reference to FIG. 9 and FIG. 10. In the example of the present exemplary embodiment, the policy database 100 stores a security level table in addition to the policy table and the stamp-associated information table.

FIG. 9 shows an example of contents of the stamp-associated information table of the example of the present exemplary embodiment. In the table of the example of FIG. 9, stamp IDs, stamp images and security levels are registered in correspondence to marks indicating that a policy is to be applied with respect to a document. The stamp IDs are identification information that is applied with respect to marks. The stamp images are images of the corresponding marks, and this point is the same as the example of FIG. 4. The security levels are information indicating groups or classes of policies. The security level table is a table that holds information relating to these security levels. It will be noted that different stamp images may also be registered in correspondence to the same security level in the stamp-associated information table.

FIG. 10 shows an example of contents of the security level table. In the table of the example of FIG. 10, values of the respective items of security level, user information and policy ID are registered in correspondence with each other. Here, in the column of user information, there is registered information that is the same as the user information in the stamp-associated information table of the example of FIG. 4. In the column of policy ID, there are registered policy IDs of policies corresponding to sets of the security levels and the user information.

It will be noted that, in the example of the present exemplary embodiment, the policy table may have the same configuration as that of the policy table described with reference to FIG. 2.

In the example of the present exemplary embodiment also, the entire flow of the procedure of the processing that generates a protected document in the policy server may be the same as that of the procedure of the aforementioned processing described with reference to the flowcharts of the examples of FIG. 7 and FIG. 8. Portions where the detailed procedure of the processing differs will be described below.

In the example of the present exemplary embodiment, in step S100 (FIG. 8) of the applicable policy decision processing (step S10 of FIG. 7), first, the policy deciding unit 150 acquires, from the stamp-associated information table, the security level corresponding to the stamp image that has been extracted from the document image data. For example, referring to the table of the example of FIG. 9, if the stamp image is "Classified", then the security level "SL 2" is acquired. When the policy deciding unit 150 acquires the security level, the policy deciding unit 150 acquires, as an applicable policy candidate, the policy ID for which a correspondence has been established with the set of the acquired security level and the user information that has been extracted from the document image data. For example, when the security level that the policy deciding unit 150 has acquired in correspondence to the stamp image is "SL 2", if the user information is "D Group", then the policy ID "Policy 2" corresponding to that set is acquired as the candidate. Further, even if the stamp image is the same "Classified" and the security level "SL 2" is acquired, if the user information is "YY Section", the policy ID "Policy 5" is acquired as the applicable policy candidate.

Next, an example of an exemplary embodiment that uses a configuration of a stamp-associated information table of yet another example will be described with reference to FIG. 11. FIG. 11 shows an example of contents of the stamp-associated information table of the example of the present exemplary embodiment. In the table of the example of FIG. 11, there are registered the respective items of stamp image, user information, policy ID and use period. Of these, stamp image, user information and policy ID are the same as those of the stamp-associated information table of the example of FIG. 4. The values of the column of use period of the example of FIG. 11 indicate changes in the use periods from the policies of the corresponding policy IDs. In other words, the values of the column of use period indicate differences between the use periods of the policies of the corresponding policy IDs and the use periods of the policies that are to be applied with respect to the corresponding documents. For example, the value of the column of use period of the policy ID "Policy 2" corresponding to the set where the stamp image is "Classified" and the user information is "D Group" is "3 Years". This indicates that a policy whose use period has been changed to "3 Years" in the policy of the policy ID "Policy 2" is to be applied with respect to the document from which the set of the stamp image "Classified" and the user information "D Group" has been obtained. For example, referring to the line of the policy ID "Policy 2" in the policy table of the example of FIG. 2, the policy server 10 changes the use period from "Indefinite" to "3 Years" and applies, with respect to the corresponding document, the policy that has the same "D Group" and "Read/Edit" as that line as the values of the use range and allowable operations. Further, for example, the value of the column of use period of the policy ID "Policy 1" corresponding to the set where the stamp image is "Classified" and the user information is "XX Project Plan T" is empty. This indicates that the policy of policy ID "Policy 1" is to be applied as is (without any change) with respect to the document from which the set of the stamp image "Classified" and the user information "XX Project Plan T" has been obtained.

Figure 12:
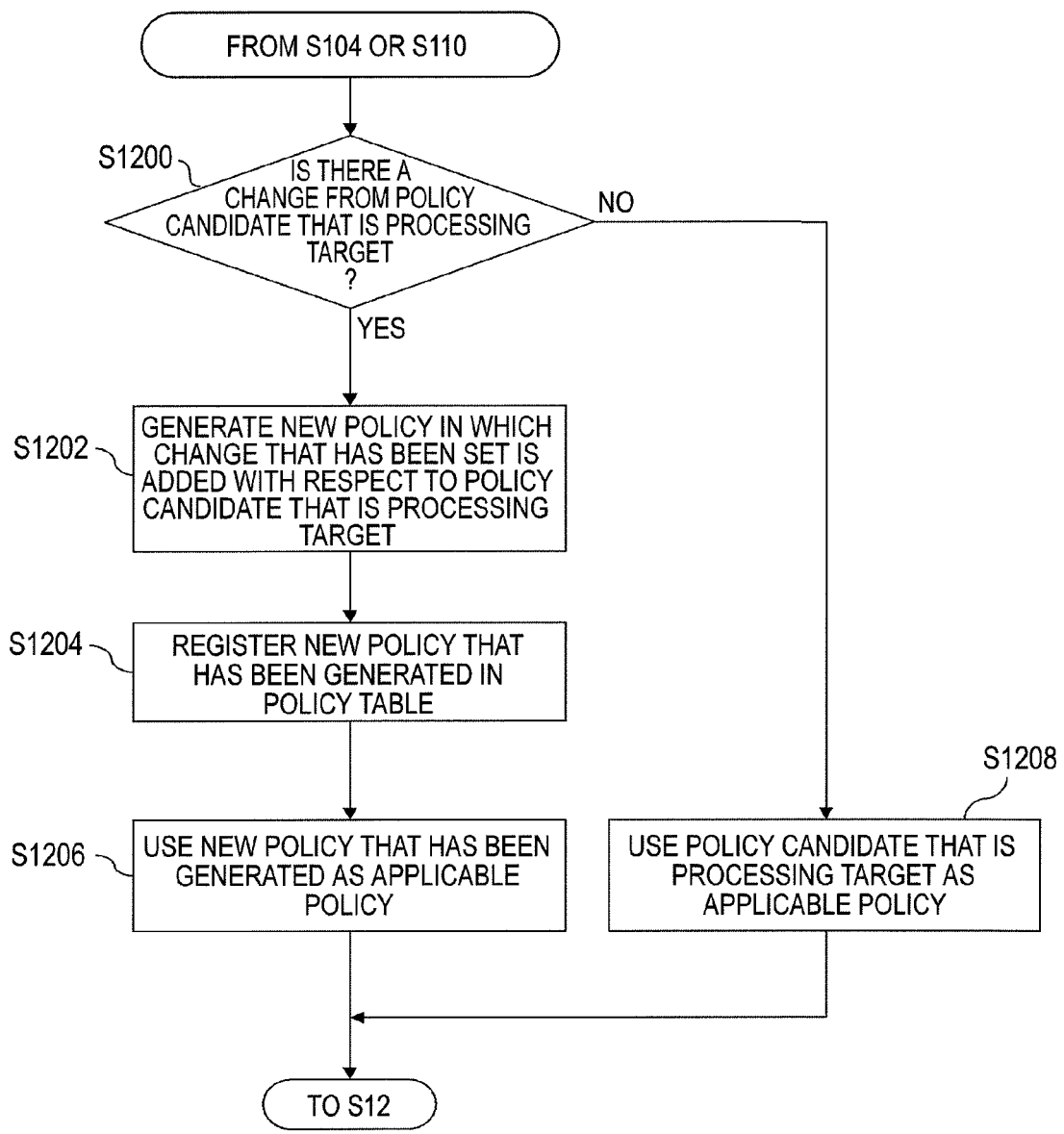
FIG. 12 is a flowchart showing a modification of a partial procedure of the applicable policy decision processing.

In the example of the exemplary embodiment that uses the stamp-associated information table of the example of FIG. 11 also, the entire flow of the procedure of the processing of the policy server 10 that generates a protected document may be the same as that of the example of the processing described with reference to FIG. 7 and FIG. 8. However, in the example of the present exemplary embodiment, instead of the processing of step S112 or step S114 of FIG. 8, the policy server 10 performs the processing of the procedure of the flowchart exemplified in FIG. 12. After step S110 of FIG. 8 or after the policy determining unit 150 proceeds to NO in step S104, one policy ID corresponding to the set of the user information and the stamp image that has been extracted from the document image data is decided. The policy deciding unit 150 uses that one policy ID as an object for processing and starts the processing of the procedure of the example of FIG. 12.

First, the policy deciding unit 150 refers to the stamp-associated information table and determines whether or not information indicating a difference between the policy of the policy ID that is the object for processing and the policy to be applied with respect to the document is registered (step S1200). For example, referring to the table of the example of FIG. 11, when the policy ID "Policy 3" corresponding to the set of the stamp image "Private" and the user information "Personnel Information Roster" is the object for processing, the value of the column of use period is empty and information indicating a difference is not registered. When, as in this example, information indicating a difference is not registered in relation to the policy ID that is the object for processing (NO in step S1200), the policy deciding unit 150 proceeds to step S1208. Further, for example, in the table of the example of FIG. 11, when the policy ID "Policy 4" corresponding to the set of the stamp image "Private" and the user information "Customer Support" is the object for processing, the value of the column of use period is "1 Year". If, as in this example, information indicating a difference is registered in relation to the policy ID that is the object for processing (YES in step S1200), the processing proceeds to step S1202.

In step S1202, the policy deciding unit 150 generates a new policy having contents where the change registered in the stamp-associated information table has been added with respect to the contents of the policy of the policy ID that is the object for processing. For example, when the policy ID "Policy 4" corresponding to the set of the stamp image "Private" and the user information "Customer Support" is the object for processing, the policy deciding unit 150 acquires the contents of the policy of the policy ID "Policy 4" from the policy table (see FIG. 2) and changes the value of the use period of the acquired contents from "3 Years" to the "1 Year" registered in the stamp-associated information table. Then, in regard to the use range and the allowable operations, the policy deciding unit 150 generates a new policy having the same values (the use range of "Customer Support, CS Manager" and the allowable operation of "Read") as the values it acquired from the policy table on the basis of the policy ID "Policy 4" and having "1 Year" after the change as the value of the use period.

When the policy deciding unit 150 generates the new policy, the policy deciding unit 150 applies a new policy ID with respect to the generated new policy and registers the new policy ID in the policy table (step S1204). That is, the policy deciding unit 150 establishes a correspondence between, and registers in the policy table, the new policy ID and the contents of the policy it generated in step S1202. Further, in step S1204, the policy deciding unit 150 may also register, in the policy table, the policy ID that is the object for processing (this is the policy ID of the policy having some contents in common with the generated new policy) in association with the generated new policy.

Further, the policy deciding unit 150 uses the new policy it generated in step S1202 as the policy to be applied with respect to the document including the document image data that are the object for processing (step S1206).

It will be noted that, in the processing of step S1208 when information indicating a difference is not registered in regard to the policy ID that is the object for processing, the policy deciding unit 150 decides, as the applicable policy, the policy of the policy ID that is the object for processing. In this case, the policy deciding unit 150 does not generate a new policy.

When the applicable policy is decided in step S1206 or step S1208, then in steps S12 and S14 of FIG. 7, a protected document including the policy ID of the applicable policy that has been decided is registered in the document database 120.

In the stamp-associated information table of the example of FIG. 11, only the use periods are registered as changes in the contents of the policies. However, in addition to the use period or instead of the use period, the policy deciding unit 150 may also register, in the stamp-associated information table, changes in regard to at least one of the use ranges and the allowable operations. For example, the policy deciding unit 150 registers changes that make the use ranges narrower or that make the types of allowable operations fewer.

In the examples of the various exemplary embodiments described above, a mark indicating that a policy is to be applied with respect to a document is applied to a paper document by impressing a stamp, but the method of applying such a mark to a paper document is not invariably limited to impressing a stamp. For example, a mark that is the same as the mark of a stamp may also be printed on a paper document. Even with respect to a paper document on which a mark has been printed, the policy server 10 may execute, in the same manner as the processing described above, the stamp image extraction processing (step S4 of FIG. 7) resulting from the stamp analyzing unit 130.

Further, as information for recognizing marks of stamps, instead of registering stamp images in the stamp table, the policy server 10 may also register character strings (e.g., "Secret", "Classified" and "Important", etc.) included in stamp marks. When the policy server 10 registers character strings in the stamp table, then in step S4 of the processing of the example of FIG. 7 that the policy server 10 performs, the stamp analyzing unit 130 uses OCR technology, for example, to extract, from the document image data, the character string registered in the stamp table.

In regard to the date mark indicating the person in charge of the paper document also, instead of actually impressing a stamp to apply the date mark to the paper document, a stamp image in the shape of the date mark may also be printed on the paper document. In this case also, the policy server 10 may execute, in the same manner as the processing described above, the user information extraction processing (step S6 of FIG. 7) that the user information analyzing unit 140 performs.

Further, in extracting the user information (step S6 of FIG. 7), when the policy server 10 uses OCR technology to extract the employee number or the name of the person in charge with respect to the contents of the paper document without using a stamp image of the date mark, the policy server 10 may also register, in the user information database 110, a table where the column of stamp image has been omitted from the user stamp table of the example of FIG. 6.

It will be noted that the specific configuration of the policy table is not limited to the example of FIG. 2. For example, as for the items that define the contents of the policies, the policy table may further include items other than use period, use range and allowable operations. For example, the policy table may also include settings and the like for processing that is also performed when executing a certain type of operation, such as "overlay-print a mark that has been set beforehand at the time of printing". Further, for example, instead of allowable operations or in addition to allowable operations, the policy table may also register types of operations that are prohibited (prohibited operations) with respect to users or groups indicated in the corresponding use ranges.

Figure 13:
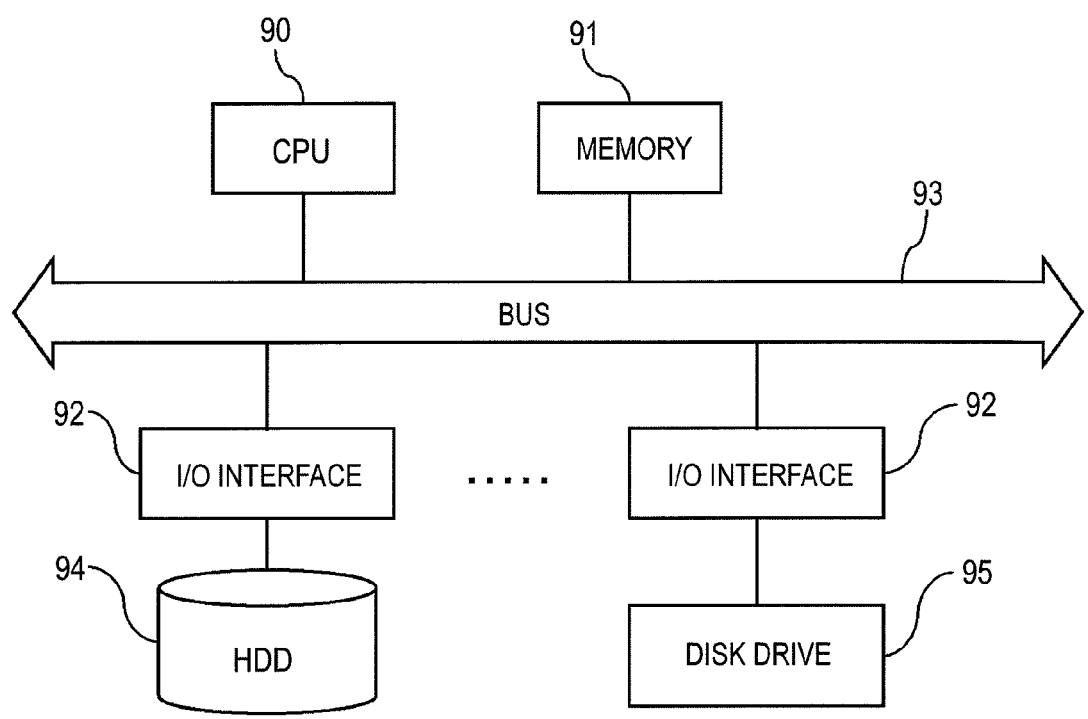
FIG. 13 is a diagram showing an example of a hardware configuration of a computer.

The policy server 10 of the examples of the various exemplary embodiments described above is typically realized by executing, in a general computer, a program in which the functions or the processing contents of each unit of the policy server 10 are described. The computer has, for example, as hardware, a circuit configuration where, as shown in FIG. 13, a central processing unit (CPU) 90, a memory (primary storage) 91 and various input/output (I/O) interfaces 92 are interconnected via a bus 93. Further, a hard disk drive (HDD) 94 and a disk drive 95 for reading portable nonvolatile recording media of various specifications such as CDs, DVDs and flash memories are connected to the bus 93 via, for example, the input/output interfaces 92. The hard disk drive 94 or the disk drive 95 functions as an external storage device with respect to the memory. The program in which the processing contents of the exemplary embodiments are described is saved in a fixed storage device such as the hard disk drive 94 and is installed in the computer via a recording medium such as a CD or a DVD or via a network. The processing of the exemplary embodiments is executed as a result of the program stored in the fixed storage device being read to the memory and executed by the CPU.

Exemplary embodiments of examples where the policy server 10 is realized by one computer have been described above, but the various functions of the aforementioned examples of the policy server 10 may be dispersed and realized in plural computers. Further, of the functions of the policy server 10, at least some of the stamp analyzing unit 130, the user information analyzing unit 140, the policy deciding unit 150, the protected document generating unit 160 and the protected document registering unit 170 may also be realized in the image processing apparatus 20. In this case, the image processing unit 20 refers to the policy database 100 and the user information database 110 on the policy server 10 and executes the processing of the procedures of the various examples described above with respect to document image data obtained by scanning and reading a paper document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
at least one central processing unit that refers to a use limit information memory which stores use limit information indicating a policy of a use limit of a document corresponding to a set of a mark image indicating that use of the document is limited and user associated information relating to a user associated to the document, extracts the mark image and person in charge information from document image information obtained by reading a paper document including the mark image and marked with the person in charge information indicating a person in charge with respect to contents of the paper document, acquires the use limit information corresponding to a set of the extracted mark image and the user associated information corresponding to the extracted person in charge information from the use limit information memory, generates a document by applying the acquired use limit information to the document image information, and registers the generated document in a document memory.

2. The information processing apparatus according to claim 1, wherein
 the use limit information memory stores association information that associates the mark image with a group of the use limit information, and the use limit information corresponding to a set of the class of the use limit information and the user associated information, and
 the at least one central processing unit acquires, from the use limit information memory, the use limit information corresponding to a set of the class of the use limit information associated with the mark image extracted from the association information and the user associated information corresponding to the extracted person in charge information, and registers the acquired use limit information associated with the document including the document image information in the document memory.

3. The information processing apparatus according to claim 1, wherein
 the at least one central processing unit further refers to an organization information memory that stores identification information of users belonging to each organization,
 the user associated information included in the set corresponding to the use limit information indicates one of the organizations stored in the organization information memory,
 the person in charge information includes identification information of a user who is the person in charge with respect to the contents of the paper document, and
 the at least one central processing unit uses, as the user associated information corresponding to the extracted person in charge information, the organization to which the user of the identification information included in the extracted person in charge information belongs.

4. An information processing apparatus, comprising:
 at least one central processing unit that refers to a use limit information memory which stores use limit information indicating a policy of a use limit of a document corresponding to a set of a mark image indicating that use of the document is limited and user associated information relating to a user associated to the document, extracts the mark image and person in charge information from document image information obtained by reading a paper document including the mark image and the person in charge information indicating a person in charge with respect to contents of the paper document, acquires the use limit information corresponding to a set of the extracted mark image and the user associated information corresponding to the extracted person in charge information from the use limit information memory, and registers the acquired use limit information associated with a document including the document image information in a document memory,
 wherein
 the at least one central processing unit further refers to an organization information memory that stores identification information of users belonging to each organization,
 the user associated information included in the set corresponding to the use limit information indicates one of the organizations stored in the organization information memory,
 the person in charge information includes identification information of a user who is the person in charge with respect to the contents of the paper document, and
 the at least one central processing unit uses, as the user associated information corresponding to the extracted person in charge information, the organization to which the user of the identification information included in the extracted person in charge information belongs, and
 the information processing apparatus further comprising an output unit that outputs information indicating that there are plural pieces of the user associated information corresponding to the extracted person in charge information when there are a plurality of organizations to which the user of the identification information included in the extracted person in charge information belongs, and that the at least one central processing unit acquires plural pieces of the use limit information corresponding to the plural pieces of the user associated information from the use limit information memory.

5. The information processing apparatus according to claim 4, wherein when there are plural pieces of the user associated information corresponding to the extracted person in charge information and the at least one central processing unit acquires plural pieces of the use limit information corresponding to the plural pieces of the user associated information from the use limit information memory, the at least one central processing unit receives an instruction selecting one of the acquired plural pieces of the use limit information, and registers the piece of use limit information selected by the instruction, associated with the document including the document image information in the document memory.

6. The information processing apparatus according to claim 4, further comprising:
 an extraction unit that further extracts information indicating the organization to which the person in charge belongs from the document image information, when there are plural pieces of the user associated information corresponding to the extracted person in charge information and the at least one central processing unit acquires plural pieces of the use limit information corresponding to the plural pieces of the user associated information from the use limit information memory,
 wherein the output unit further outputs information specifying the use limit information corresponding to user associated information corresponding to the organization to which the person in charge belongs, indicated by information extracted by the extraction unit among the acquired plural pieces of use limit information.

7. The information processing apparatus according to claim 1, wherein
 the use limit information memory stores the use limit information corresponding to the set of the mark image and the user associated information in association with change information indicating a change to be made with respect to the use limit information, and
 the at least one central processing unit generates new use limit information by making the change indicated by the change information associated with the use limit information with respect to the use limit information corresponding to the set of the extracted mark image and the user associated information corresponding to the extracted person in charge information, and registers the generated use limit information associated with the document including the document image information in the document memory.

8. A non-transitory computer readable medium storing a program causing a computer to execute a process for processing information, the process comprising:
 referring to a use limit information memory which stores use limit information indicating a policy of a use limit of a document corresponding to a set of a mark image indicating that use of the document is limited and user associated information relating to a user associated to the document;

extracting the mark image and person in charge information from document image information obtained by reading a paper document including the mark image and marked with the person in charge information indicating a person in charge with respect to contents of the paper document;

acquiring the use limit information corresponding to a set of the extracted mark image and the user associated information corresponding to the extracted person in charge information from the use limit information memory;

generating a document by applying the acquired use limit information to the document image information; and registering the generated document in a document memory.

* * * * *